United States Patent [19]

Warfel et al.

[11] Patent Number: 4,587,330

[45] Date of Patent: May 6, 1986

[54] PURIFICATION OF POLYMER SOLUTIONS

[75] Inventors: David R. Warfel, Exton; Harold L. Nicholson, West Chester, both of Pa.

[73] Assignee: Atlantic Richfield Company, Los Angeles, Calif.

[21] Appl. No.: 704,237

[22] Filed: Feb. 22, 1985

[51] Int. Cl.$^4$ ................................................ C08F 6/12
[52] U.S. Cl. ...................................................... 528/490
[58] Field of Search .......................................... 528/490

[56] References Cited

U.S. PATENT DOCUMENTS

| | | | |
|---|---|---|---|
| 3,177,191 | 4/1965 | De Vries et al. | 528/490 X |
| 3,287,344 | 11/1966 | Strobel | 528/490 X |
| 3,309,348 | 3/1967 | Wentz, Jr. | 528/490 X |
| 3,801,520 | 4/1974 | Hogan et al. | 528/490 X |
| 4,415,695 | 11/1983 | Sarkar | 528/490 X |

*Primary Examiner*—Paul R. Michl
*Attorney, Agent, or Firm*—Lewis J. Young

[57] ABSTRACT

Cloudy material in organic diluent solutions of polymers prepared by anionic polymerization with a lithium initiator is removed by treating the polymer solutions resulting from the polymerization with boric acid, separating the solid material from the solutions, and isolating the polymer.

15 Claims, No Drawings

PURIFICATION OF POLYMER SOLUTIONS

BACKGROUND OF THE INVENTION

This invention relates to the purification of polymer solutions and more particularly to elimination of the hazy, cloudy or milky appearance often observed in organic solutions of polymers prepared by anionic polymerization.

A common occurrence when redissolving in an organic medium polymers synthesized with an anionic initiator is a cloudy, milky or hazy appearance indicative of a residue of the polymerization reaction. Usually, the polymer solution directly resulting from the anionic polymerization will be clear and the cloudy condition will appear when the polymer is isolated and redissolved. Sometimes the hazy appearance also occurs upon aging of a polymer solution directly resulting from the synthesis. Purification is exceedingly difficult to achieve by conventional filtration practiced alone or with filtration aids. For example, the impurities have been found resistant to treatment with adsorbents such as alumina, talc, silica gel, various forms of alumina, clays and carbon black. The impurities in such solutions have also been found resistant to conventional salting out techniques using materials such as sodium chloride, sodium acetate, sodium carbonate, sodium bicarbonate and calcium carbonate.

Removal of such impurities is important for many commercial uses of the polymers and organic diluent solutions of such polymers, for example when the polymers are intended for use as clear top coats for laminates and other substrates, or in adhesives. In this specification the term "impurity" or similar term means an undesired material in an organic diluent solution of such polymers observable as a cloudy, milky or hazy condition, and "purification" means removal of such material.

The problem of purifying polymers as in the present invention should be distinguished from efforts to prevent or reduce the formation of color and gel in polymer solutions. In U.S. Pat. No. 4,415,695 to S. B. Sarkar a method is described for preparing essentially color-free, stabilized polymers by the addition of boric acid to organic solutions of polymers resulting from anionically initiated syntheses, preferably with the reagent for terminating the polymer precursor, but in any event prior to the addition of polymer stabilizing agents. The boric acid is used in amounts ranging from 0.02 to 1.0 parts by weight per 100 parts by weight of the polymer, preferably 0.1 to 0.5 parts by weight on 100 parts of polymer. Following the addition of the boric acid and the stablizing agent, the polymer is recovered from the solution by coagulation, vacuum drying, or other concentration technique. By such treatment essentially colorless polymers are prepared as compared with slightly yellow or deep yellow untreated polymers. By visual examination of polymer samples which had been oven aged for 6 days at 212° F., it was also determined that the boric acid treatment prevented the formation of polymer gel.

It will be apparent that purification in the sense of the present invention is not described or suggested in the Sarkar patent. In Sarkar, no effort was made to remove any material from the polymer solutions following the boric acid treatment. The boric acid treatment is entirely for the purpose of preventing color and gel formation, and the patent provides no indication of impurities in untreated polymer solutions in the sense of cloudy or hazy material, the removal of which is the objective of the present invention.

SUMMARY OF THE INVENTION

In accordance with the present invention, impurities observable as cloudy material in organic diluent solutions of polymers prepared by anionic polymerization are conveniently removed by contacting the polymer solutions with boric acid and separating solid phase material by filtration or similar means. The resulting polymers when isolated and redissolved in organic diluents, form solutions which are essentially clear and water-white.

DETAILED DESCRIPTION

The polymers which may be purified in accordance with the invention are those prepared from monomers susceptible to anionic polymerization. In most cases, such monomers are those having a polymerizable olefinic group such as vinyl, vinylidene, or vinylene containing compounds. The anionic polymerization may be a homopolymerization or the copolymerization of two or more different monomers including monomers of different functionality, such as the copolymerization of ethylenically unsaturated monomers with epoxy or thioepoxy monomers. In anionic polymerization, a monomer or combination of monomers is polymerized under anhydrous conditions in an organic diluent in the presence of a lithium-based initiator such as lithium metal, alkyl lithium compounds, aryl lithium compounds or mixtures thereof such as disclosed in U.S. patent 3,317,918. The preferred initiators are alkyl lithium compounds such as the lower alkyl lithium compounds, of which butyl lithium, e.g., sec. butyl lithium, is the initiator of choice.

The organic diluent may be inert or may be what is commonly termed a "reactive diluent," that is, a liquid comonomer capable of anionically initiated copolymerization with the primary monomer. More usually, the organic diluent is an inert organic solvent commonly employed in solution polymerization, such as butane, hexane, toluene, cyclohexane, methylcyclohexane, heptane, pentane, isopentane, tetrahydrofuran, benzene and the like. Mixtures of reactive diluents and such inert organic solvents are also useful.

The initial result of the anionic polymerization is a "living polymer", that is, a polymer having a terminal atom carrying a negative charge. This polymer may then be copolymerized with another monomer or reacted with a halogen-containing or other terminating agent. In many cases, however, the polymeric anion is highly reactive and non-selective in its reaction with the terminating agent and results in polymer chains which have undesired functionality and molecular weight. Such undesirable consequences can be avoided by rendering the living polymer less reactive by capping with a less reactive end group prior to termination. Suitable capping agents include lower alkylene oxides or sulfides such as ethylene and propylene oxide or sulfide.

When the terminating agent itself contains alpha, beta-ethylenic unsaturation or other polymerizable group, the resulting polymeric material is a macromolecular monomer also known as a "macromonomer". Anionically polymerized polymers of this type are described in U.S. Pat. Nos. 3,786,116 and 3,842,059 to Milkovich et al, in European patent publication 104,046 filed Sept. 9, 1983 by Husman et al, and in the Sarkar patent mentioned above.

Preferably, the macromonomer has a molecular weight of at least 2,000, e.g., about 3,000 to 50,000, more preferably about 4,000 to 30,000, and the molecular weight distribution ("polydispersity") ranges up to 3 or more, preferably up to about 2. Illustrative macromonomers are described in the Examples below.

Accordingly, the present invention contemplates the treatment of all anionically synthesized polymers prepared from monomers of which the following are illustrative: vinyl aromatic compounds, such as styrene, alpha-methylstyrene, p-tert. butyl styrene, indene vinyl toluene and its isomers; vinyl unsaturated amides such as acrylamide, methacrylamide, N,N-dilower alkyl acrylamides, e.g., N,N-dimethylacryalmide; acenaphthalene; 9-acrylcarbazole; acrylonitrile and methacrylonitrile; organic isocyanates including lower alkyl, phenyl, lower alkyl phenyl and halophenyl isocyanates; organic diisocyanates including lower alkylene, phenylene and tolylene diisocyanates; lower alkyl and allyl acrylates and methacrylates including methyl, t-butyl acrylates and methacrylates; lower olefins, such as ethylene, propylene, butylene, isobutylene, pentene, hexene, and the like; vinyl esters of aliphatic carboxylic acids such as vinyl acetate, vinyl propionate, vinyl octoate, vinyl oleate, vinyl stearate, vinyl benzoate; vinyl lower alkyl ethers; vinyl pyridines, vinyl pyrrolidones; dienes including isoprene and butadiene; lactams and lactones such as caprolactam and caprolactone; alkylene oxides such as ethylene oxide and propylene oxides; and aldehydes including formaldehyde and acetaldehyde. The term "lower" is used above to denote organic groups containing eight or fewer carbon atoms. The preferred olefinic containing monomers are conjugated dienes containing 4 to 12 carbon atoms per molecule and the vinyl-substituted aromatic hydrocarbons containing up to about 12 carbon atoms. Many other suitable monomers are disclosed in Macromolecular Reviews, vol. 2, pp. 74–83, Interscience Publishers, Inc. (1967), entitled "Monomers Polymerized by Anionic Initiators." The disclosures of the aforementioned patents and publication are incorporated herein by reference.

From the foregoing discussion, it will be apparent that upon termination of the anionic polymerization with a halogen-containing compound, a lithium salt is a by-product. If termination is with a compound not containing halogen ions, the lithium may combine with other ionic species and form a hydride or hydroxide, for example. However, even when halogen ion is present, such hydrides or hydroxides may form. Preferably, termination with water is avoided, since water tends to cause emulsification and thereby impede filtration or other technique used to remove solid phase material from the polymer solution after the boric acid treatment. Analysis of the material which is separated in the purification method of the invention suggests that it is a lithium halide, hydride or hydroxide, or some form of complex involving lithium, which is responsible for the cloudy material observed upon aging for several months of a freshly synthesized polymer solution or upon redissolving untreated (freshly prepared) polymer in an organic diluent. In the latter case, the cloudy condition is not observed in the polymer solution immediately resulting from the anionic polymerization; the cloudy material appears only when the freshly prepared polymer product is isolated in solid form and then redissolved in the organic diluent.

The first step in practicing the method of the invention is therefore to contact the polymer solution resulting from the anionic polymerization with boric acid. Any form of boric acid is suitable for such purpose, including both the ortho and meta forms, and both powdered and granular boric acid. Since it is possible that the boric acid neutralizes any lithium hydroxide or lithium hydride formed in the polymerization, reacts with excess halogen-containing terminating agent and also acts as an adsorbent, powdered boric acid is preferred because of its greater pore volume. At least about 3 wt. % of boric acid based on the weight of the polymer will be effective, preferably from about 5 to 20 wt. % and more preferably at least 10 wt. % if the boric acid is granular. Generally, best results are obtained with about 3–10 wt. % of powdered boric acid or about 10–15 wt. % of granular boric acid on polymer solids for a 40–60% polymer solid solution.

In batch treatments the mixture of polymer and boric acid typically is agitated in organic diluent for about 1–3 hours at 50°–60° C. for a 40–60% polymer solids solution containing about 10 wt. % boric acid on polymer solids. For higher polymer solids solutions and/or lower concentration of boric acid, a longer treatment time may be required, and the conditions of agitation and temperature may be adjusted accordingly.

After contact of the polymer solution with the boric acid, the solid phase material in the polymer solution is separated. The separation is effected by decanting, filtration (by gravity or with a vacuum or other filtering aid), centrifugation or other convenient separatory process. The purified polymer is then isolated in the conventional manner, as by vacuum drying, devolatization extrusion or by precipitation in excess methanol followed by vacuum drying or evaporation with a wiped thin film evaporator.

In an alternate method of treating the polymer solution, the solution is passed through a bed of powdered or granular boric acid. The bed can be contained in a column packed with the boric acid (alone or with filtering aids) and containing fine screens at both ends, allowing the solution to pass through but holding back the boric acid. Another apparatus is in a pressure filter of the Niagara or Sparkler type. Such pressure filters have a multiplicity of plates (e.g., about 7–30) covered by filter paper to support and hold back the boric acid bed while allowing the liquid to pass. The polymer solution to be treated is passed upwardly through a pertion forated conduit centrally positioned in the pressure filter chamber and the solution passes through the filter plates to the outer walls of the chamber from where it flows downwardly to an exit.

The column and pressure filter can each be used in single or multiple pass, or continuous recirculation modes. In the later mode, the solution can be pumped out of an adjacent polymerization reactor, through the column or pressure filter, and back into the reactor. The recirculation may be continued until the desired purity is obtained in the polymer solution.

Through-put rates may be adjusted in the column or pressure filter as required for adequate contact time and efficient purification. For a 200 lb. boric acid bed, for example, a polymer solution (about 40–60% solids) through-put of about 10 gal./min. will be effective.

The effectiveness of the purification treatment is conveniently confirmed by dissolving the treated, isolated polymer in an organic diluent and observing the resulting solution. The treatment has been effective if the solution is clear and waterwhite. The organic diluent used in this test may be the same diluent used to form the polymer solution as part of the boric acid treatment and thus includes an inert organic solvent such as cyclohexane or toluene, a reactive diluent (of which 1,6-hexanediol diacrylate is representative), or a mixture of an inert organic solvent and a reactive diluent. Typical reactive diluents are the liquid monomers or oligomers of up to about 2000 molecules weight selected from mono- or polyethylenically unsaturated monomers such as described in U.S. Pat. Nos. 4,382,135, 4,399,192, 4,163,809, 4,481,258, 4,360,540, 3,368,900, 3,380,831 and 3,594,410, incorporated herein by reference.

In the separation step, filtering aids conventionally used in organic separatory processes may be employed such as kieselguhr, diatomaceous earth, molecular sieves, sintered glass and membranes of various types.

The following examples will further illustrate the invention but are not intended to necessarily limit the scope thereof. In the examples and throughout the specification and claims, all parts and percentages are by weight unless otherwise stated.

EXAMPLE 1

(A) Preparation of Macromonomer: Polystyrene Terminated with Methacryloyl Chloride A glass and stainless steel reactor was charged with 1000 grams of cyclohexane and 1500 grams of styrene. To the mixture was added 79.6 ml of sbutyl lithium solution (1.45M in cyclohexane). The temperature was maintained at 60° C. for 30 minutes and 61.6 grams of ethylene oxide was added. The reaction was held at 60° C. for another 45 minutes. To the resulting solution was added 16.9 grams of methacryloyl chloride to give a macromonomer of 13,000 molecular weight, measured by GPC. The product polymer solution was clear and water-white.

(B) Purification

The polymer solution of Part A above was adjusted to 60% polymer solids in cyclohexane. To 100 gram samples of the polymer solution in each of 12 citrate bottles was separately added 10 grams of the reagents listed in Table I below. The samples were mildly agitated by end-over-end rotation overnight (about 18 hours) at 60° C., then suction filtered through a 40-60 micron sintered glass funnel to remove solid material. The polymer in each filtrate was then separated by vacuum drying. The solid polymer samples (2.5 grams each) were redissolved in 5 grams of 1,6 hexanediol diacrylate. The results of the experiments are summarized in Table I from which it will be seen that the only reagent that provided filterable and clear, water-white polymer solutions upon redissolving of the treated polymer was boric acid.

TABLE I

| Sample No. | Reagent | Result |
| --- | --- | --- |
| 1. | alumina (neutral) | slightly cloudy, pale yellow |
| 2. | sodium bicarbonate | slightly cloudy, water-white |
| 3. | silica gel (Syloid 72) | very slightly cloudy, water-white |
| 4. | sodium chloride | cloudy, water-white |
| 5. | sodium carbonate | cloudy, pale yellow |
| 6. | aluminum oxide | cloudy, yellow |
| 7. | sodium acetate | would not filter |
| 8. | boric acid (granular) | very clear, water-white |
| 9. | talc (Emtol 41) | would not filter |
| 10. | clay (Dixie) | would not filter |

TABLE I-continued

| Sample No. | Reagent | Result |
| --- | --- | --- |
| 11. | alumina (spheres) | very cloudy, water-white |
| 12. | molecular sieves (ground) | very cloudy, water-white |
| 13. | none (control) | very cloudy |

Elimination of cloudy material was not achieved in similar experiments with sodium acetate, citric acid, borax and other forms of alumina (basic and acidic). Alumina also introduced discoloration. Water tended to emulsify the polymer solutions.

EXAMPLE 2

A boric acid concentration/contact time experiment with five samples was run as follows to determine conditions for purification of polymer.

(1) From a 2,500 gram sample of a clear, water-white polymer solution (60.1% polymer solids) prepared as described in Example 1, Part A was drawn off a 100 gram sample which was suction-filtered through a 40-60 micron sintered glass funnel and set aside as a control.

(2) To the remaining 2,400 grams was added 57.6 grams boric acid (technical) to provide a mixture containing 2.4 wt. % boric acid on polymer solution (4.0 wt. % boric acid on polymer solids). The mixture was stirred 30 minutes at 60° C. and a 100 gram sample drawn off and filtered in the same manner as the control.

(3) To the remaining 2,300 grams of polymer solution was added an additional 52.8 grams boric acid to give a mixture containing 4.8 wt. % boric acid on polymer solution (8.0 wt. % boric acid on polymer solids). This mixture was stirred 30 minutes at 60° C. and a 100 gram sample drawn off and filtered in the same manner as the control.

(4) To the remaining 2,200 grams of polymer solution was added an additional 48.0 grams boric acid to give a mixture containing 7.2 wt. % boric acid on polymer solution (12 wt. % boric acid on polymer solids). This mixture was stirred 30 minutes at 60° C. and a 100 gram sample drawn off and filtered in the same manner as the control.

(5) To the remaining 2,100 grams of polymer solution was added an additional 43.2 grams boric acid to give a mixture containing 9.6 wt. % of boric acid on polymer solution (16 wt. % boric acid on polymer solids). This mixture was stirred 30 minutes at 60° C. and a 100 gram sample drawn off and filtered in the same manner as the control.

Each of the foregoing five samples was then vacuum dried to remove solvent and 2.5 grams of the polymer residues were redissolved in 5 grams of 1,6-hexanediol diacrylate. The results of the experiment are summarized in Table II below from which it will be noted that only sample 5, containing 9.6 wt. % of boric acid on polymer solids, was clear. All other samples, treated with lesser amounts of boric acid, gave cloudy solutions, indicating that for the conditions of the experiment (polymer, solvent, contact time, etc.) a boric acid concentration in excess of 7.2 wt. % on polymer solids was critical for effective purification.

TABLE II

| Sample No. | Boric acid (wt. %) On polymer solids | On polymer solution | Effect of Treatement Before | After |
| --- | --- | --- | --- | --- |
| 1 (control) | — | — | cloudy | cloudy |
| 2 | 2.4 | 4 | cloudy | cloudy |
| 3 | 4.8 | 8 | cloudy | cloudy |
| 4 | 7.2 | 12 | cloudy | cloudy |
| 5 | 9.6 | 16 | cloudy | clear |

To confirm the result for sample 5 of Table II a portion of the balance (2,000 grams) of the polymer solution from which sample 5 was drawn was permitted to sit overnight (about 18 hours), decanted, and the liquid phase then added to excess methanol to precipitate the polymer. The methanol was removed by vacuum drying and the isolated polymer was redissolved in 1,6-hexanediol diacrylate to provide two polymer solutions, the first containing 33 wt. % polymer and the second containing 50 wt. % polymer. Both solutions were clear and water-white, indicating effective purification.

EXAMPLE 3

In another experiment conducted to study the conditions for effective purification of polymer by boric acid treatment, 100 grams of the clear, waterwhite polymer solution (60% polymer solids in cyclohexane) prepared in Example 1, Part A was added to each of 12 citrate bottles. Varying amounts of granular boric acid (technical) were then added to each bottle and the bottles were rotated as described in Example 1, Part B at 60° C. for different periods. After treatment, the mixture in each bottle was suction filtered through a 25–50 micron sintered glass funnel to remove solid material and the filtrates vacuum dried to leave the solid polymer. The solid polymer samples (2.5 grams of each) were then redissolved in 5 grams of 1,6-hexanediol diacrylate and observed for clarity. The boric acid concentrations, treatment times and results are shown in Table III below from which it will be seen that for the particular polymer treated and the treatment conditions (time, temperature, form of boric acid, polymer diluent, agitation method, etc.), about 10% by weight of boric acid on polymer solids was required to remove material causing cloudiness in redissolved solutions of the polymer.

TABLE III

| Sample No. | Boric Acid (wt. %) On Polymer Solids | On Polymer Sol'n. | Contact Time (hrs.) | Appearance on redissolving |
| --- | --- | --- | --- | --- |
| 1 | 9.6 | 16 | 0.5 | very cloudy |
| 2 | 7.2 | 12 | 0.5 | very cloudy |
| 3 | 9.6 | 16 | 1.0 | clear, |
| 4 | 7.2 | 12 | 1.0 | cloudy |
| 5 | 4.8 | 8 | 1.0 | very cloudy |
| 6 | 2.4 | 4 | 1.0 | cloudy |
| 7 | 9.6 | 16 | 1.5 | clear, |
| 8 | 7.2 | 12 | 1.5 | cloudy |
| 9 | 4.8 | 8 | 2.0 | cloudy |
| 10 | 2.4 | 4 | 2.0 | cloudy |
| 11 | 4.8 | 8 | 3.0 | cloudy |
| 12 | 2.4 | 4 | 3.0 | cloudy |

EXAMPLE 4

The treatment described in Example 3 was repeated in all essential respects except for substitution of powdered boric acid for the granular boric acid and boric acid concentrations of 1.0, 3.0 and 5.0 wt. % based on polymer solution (0.6, 1.8 and 3.0 wt. %, respectively, on polymer solids). The polymer solutions prepared by redissolving the isolated polymer in 1,6-hexanediol diacrylate were slightly cloudy, very slightly cloudy and clear as a result of the respective boric acid treatments, indicating that powdered boric acid is effective at lower concentrations than the granular form and therefore is preferred.

In another run essentially as described in Example 3 but wherein the mixture of polymer solution and powdered boric acid was agitated for 1.5 hours at 60° C., the polymer isolated from the cyclohexane solution after synthesis and before redissolving in 1,6hexanediol diacrylate analyzed 3967 ppm chloride ion (4487 theory) without the boric acid treatment and 194 ppm chloride ion with the boric acid treatment, indicating that it is the chloride ion of the methacryloyl chloride terminating agent used in the polymer synthesis that is a cause of the cloudy material, probably in salt form as lithium chloride.

EXAMPLE 5

Substantially as described in Example 3, solutions of the below-listed polymers in cyclohexane are prepared, treated with 10% by weight boric acid on polymer solids, filtered, redissolved in 1, 6-hexanediol diacrylate and observed for clarity. The boric acid treatment removes cloudy impurities which appear in untreated samples of the redissolved polymer solutions.

(a) polystyrene terminated with acryloyl or methacryloyl chloride;

(b) polystyrene capped with ethylene oxide or ethylene sulfide and terminated with acryloyl or methacryloyl chloride;

(c) polystyrene capped with ethylene oxide or ethylene sulfide and terminated with chloromethyl styrene;

(d) polystyrene capped with ethylene oxide or ethylene sulfide and terminated with epichlorohydrin;

(e) polystyrene terminated with allyl chloride;

(f) polybutadiene capped with ethylene oxide or ethylene sulfide and terminated with acryloyl or methacryloyl chloride; and (g) any of polymers (a) to (e) with poly alpha-methylstyrene in place of polystyrene.

We claim:

1. A method of purifying a polymer prepared by anionic polymerization in an organic diluent in the presence of a lithium initiator, comprising (a) contacting the polymer solution resulting from the polymerization with boric acid, in an amount of at least about 3 wt. % based on polymer weight, to form a liquid phase and a solid phase;

(b) separating the solid phase from the liquid phase, and (c) isolating the polymer from the liquid phase.

2. The method of claim 1 wherein the amount of boric acid is in the range of about 3 to 20 wt. % based on the weight of the polymer.

3. The method of claim 1 wherein the polymer comprises a macromonomer of at least 3,000 molecular weight.

4. The method of claim 1 wherein the polymer comprises a vinyl aromatic macromonomer of at least 3,000 molecular weight.

5. The method of claim 1 wherein the lithium initiator is alkyl lithium.

6. The method of claim 1 wherein the polymer comprises a macromonomer of at least 3,000 molecular weight, the lithium initiator is alkyl lithium, and the amount of the boric acid is at least 3% based on the weight of the polymer.

7. The method of claim 6 wherein the polymer comprises a vinyl aromatic macromonomer.

8. The method of claim 5 wherein the alkyl lithium is s-butyl lithium.

9. The method of claim 6 wherein the alkyl lithium is s-butyl lithium.

10. The method of claim 1 wherein the diluent comprises a reactive monomer.

11. The method of claim 1 wherein the diluent comprises an inert solvent.

12. The method of claim 1 wherein the boric acid is contained in a filter bed and the polymer solution is contacted with the boric acid by passage through the bed.

13. The method of claim 12 wherein the filter bed is contained in a packed column.

14. The method of claim 12 wherein the filter bed comprises a plurality of plates supporting the boric acid, and the polymer solution is pressure-filtered through the plates.

15. The method of claim 1 wherein the polymer is selected from:

(a) polystyrene terminated with acryloyl or methacryloyl chloride;

(b) polystyrene capped with ethylene oxide or ethylene sulfide and terminated with acryloyl or methacryloyl chloride;

(c) polystyrene capped with ethylene oxide or ethylene sulfide and terminated with chloromethyl styrene;

(d) polystyrene capped with ethylene oxide or ethylene sulfide and terminated with epichlorohydrin;

(e) polystyrene terminated with allyl chloride;

(f) polybutadiene capped with ethylene oxide or ethylene sulfide and terminated with acryloyl or methacryloyl chloride; and (g) any of polymers (a) to (e) with poly alpha-methylstyrene in place of polystyrene.

* * * * *